United States Patent [19]

Blechinger et al.

[11] Patent Number: 5,205,170
[45] Date of Patent: Apr. 27, 1993

[54] MASS FLOW SENSOR

[75] Inventors: Chester J. Blechinger, Bloomfield Hills; Paul E. Stevenson, Livonia, both of Mich.

[73] Assignee: Ford Motor Company, Dearborn, Mich.

[21] Appl. No.: 678,379

[22] Filed: Apr. 1, 1991

[51] Int. Cl.⁵ .................................................. G01F 1/68
[52] U.S. Cl. ...................................................... 73/204.26
[58] Field of Search ............. 73/204.21, 204.23, 204.25, 73/204.26; 338/308; 357/28

[56] References Cited

U.S. PATENT DOCUMENTS

| | | | |
|---|---|---|---|
| 4,320,655 | 3/1982 | Kammermaier | 73/204.26 |
| 4,472,239 | 9/1984 | Johnson et al. | 156/647 |
| 4,478,076 | 10/1984 | Bohrer | 73/204 |
| 4,478,077 | 10/1984 | Bohrer et al. | 63/204 |
| 4,498,337 | 2/1985 | Gruner | 73/204 |
| 4,501,144 | 2/1985 | Higashi et al. | 73/204 |
| 4,548,078 | 10/1985 | Bohrer et al. | 73/204 |
| 4,561,303 | 12/1985 | McCarthy | 73/204 |
| 4,581,928 | 4/1986 | Johnson | 73/204 |
| 4,594,889 | 6/1986 | McCarthy | 73/204 |
| 4,624,137 | 11/1986 | Johnson et al. | 73/204 |
| 4,624,138 | 11/1986 | Ono et al. | 73/204 |
| 4,635,475 | 1/1987 | Jones et al. | 73/204 |
| 4,682,503 | 7/1987 | Higashi et al. | 73/755 |
| 4,688,424 | 8/1987 | Handtmann et al. | 73/204 |
| 4,696,188 | 9/1987 | Higashi | 73/204 |
| 4,776,213 | 10/1988 | Blechinger et al. | 73/202 |
| 4,825,693 | 5/1989 | Bohrer et al. | 73/204.25 |
| 4,870,860 | 10/1989 | Ohta et al. | 73/204.26 |

Primary Examiner—Herbert Goldstein
Attorney, Agent, or Firm—Roger L. May; Peter Abolins

[57] ABSTRACT

A flow sensor which includes a support structure including a base having a plurality of spaced mesas on a surface thereof is provided. A low thermal conductivity, dielectric diaphragm spanning the mesas is supported along its length thereby and forms an electrical and thermal insulation barrier over the support structure and the mesas. At least one flow sensing element is superposed on the diaphragm so that the flow sensing element is substantially electrically and thermally isolated from the support structure. A method for fabricating the flow sensor is also provided.

17 Claims, 3 Drawing Sheets

MASS FLOW SENSOR

BACKGROUND OF THE INVENTION

The present invention relates generally to air velocity or flow sensors. More specifically, the present invention relates to a structurally improved thermal anemometer-type mass air flow sensor and method for making same.

Air velocity sensors that are commercially available are commonly of the single hot wire or thermistor type and are typically mounted on the end of a long probe for insertion into an air stream. The temperature drop and the associated change in electrical resistance caused by the cooling effect of the air stream is a measure of the airflow velocity. Disadvantages of such an apparatus are for example the limited durability of the device in an automotive environment and an erroneous reading due to deposits of impurities, commonly found in the air flow of an engine, on the hot element.

As a result of these problems, many attempts in the art have been made to produce a flow sensor which utilizes silicon and its semiconductor properties, or a pyroelectric material. These attempts improved the state of the art in some respects, yet remained deficient with respect to many of the characteristics desired in a modern flow sensor. As is known, a very fine platinum or tungsten wire may be supported in the free stream and maintained at a temperature above the air intake temperature of an automobile engine by electronic sensing and feedback circuits. Any change in the air flow alters the cooling effect of the air on the heated wire. An electronic circuit can sense this change in heat transfer rate and change the heating current so as to maintain the temperature of the wire at a set value.

McCarthy, U.S. Pat. No. 4,594,889 (commonly assigned), provides a method of fabricating a mass air flow sensor on a planar silicon substrate. A pair of spaced openings are formed through the silicon substrate so that a relatively elongated, thin wire-like silicon region remains between the openings. After a silicon dioxide coating is formed on this silicon substrate, an elongated metal coating is applied to the silicon dioxide on the wire-like silicon region. The device fabricated thereby may be used as a low cost, high speed sensing element, such as a mass air flow sensor for measuring air flow in an electronic engine control system. However, the McCarthy flow sensor incorporates an elongated, thin silicon member which is susceptible to breakage upon impact of particles moving with the fluid to be measured, such as dust particles travelling with the air flow in the intake of an automobile engine control system.

Similarly, Bohrer et al, U.S. Pat. No. 4,825,693, disclose a semiconductor device which can be used as a flow sensor. The semiconductor body has a "bridge-type" support diaphragm upon which heating and sensing elements are deposited. The "bridge-type" diaphragm is suspended over a depression formed by the etching of a silicon substrate. The "bridge-type" diaphragm is relatively long and thin and is connected to the semiconductor body at one or more edges of the depression. The "bridge-type" diaphragm consists of metal sensing and heating elements disposed between two dielectric layers such as silicon nitride or silicon oxide. Such heating and sensing elements are entirely located on the bridge portion of the "bridge-type" diaphragm and are thus similarly suspended over the depression. However, no supports are provided under the "bridge-type" diaphragm between the edges of the depression. Since the sensing and heating elements are located superposed on the "bridge-type" diaphragm, their sole means of support derives from the diaphragm-edge attachment. Thus, while this structure results in minimized conductive heat losses to the semiconductor body via its minimum contact therewith, those minimum contacts also result in a relatively fragile structure that is easily susceptible to breakage.

In yet another attempt in the art, Gruner, U.S. Pat. No. 4,498,337, discloses a flow sensor having a flat, metal support base or carrier, such as titanium, which supports thin film resistors or sensing elements Interposed between the metal support base and resistors is an electrically insulating layer such as glass. So as to minimize conductive heat loss through the support base to the structure surrounding the center, portions of the sensor edges which are in contact with the surrounding structure are removed. Although Gruner's use of a metal support base may provide the flow sensor with some degree of mechanical strength, the Gruner flow sensor does not appear to have achieved the combination of high mechanical strength and low conductive heat loss as is desired More specifically, while Gruner uses a continuous flat sheet to support the electrical insulating layer and sensing/heating elements, there remains a need for not only an electrical insulating layer, but also a thermal insulating layer so as to preclude any conductive heat loss from the sensing/heating elements. Thus, there remains a need for a flow sensor which achieves a better combination of increased mechanical strength and minimized conductive heat loss.

Air flow sensors must be inexpensive, yet possess a very fast response and be accurate and rugged. These requirements are often conflicting, as evidenced by certain air flow sensors which typically comprise bulky rugged sensing elements resulting in poor response time characteristics because of increased resistivity attributed to the bulky components of larger sensing elements. Conversely, fast responding air flow sensors are typically expensive and have smaller and thus more fragile sensing elements. Moreover, state-of-the-art thermal air flow sensors must be fully inserted into the fluid flow region and, consequently are subject to destruction and/or deterioration by impacting dust, lint, or other debris in the fluid stream. However, if fragile sensing elements of air flow sensors are strengthened by increasing the width thereof, an increase in conductive heat loss from the sensing elements to the support structure is experienced.

Accordingly, there remains a need in the art for an improved thermal anemometer-type mass air flow sensor having structural improvements which render the flow sensor less susceptible to breakage upon impact by particles moving with the fluid to be measured. Furthermore, there remains a need for such a flow sensor which includes these structural improvements without significant increase in conductive heat loss attributed to the materials supporting the sensing/heating elements of the flow sensor. There also remains a need in the art for a method of making the aforementioned flow sensor so that it can readily be mass produced.

SUMMARY OF THE INVENTION

The present invention meets the aforementioned needs by providing an improved thermal anemometer-type mass air flow sensor which is less susceptible to breakage, yet does not significantly increase the conductive heat loss from the sensing/heating elements. The present flow sensor may be fabricated inexpensively in accordance with the method of the present invention which is directed to a silicon-compatible batch process described more fully hereinafter.

In accordance with one aspect of the present invention, an air flow sensor is provided comprising a support structure including a base having a plurality of spaced mesas on a surface thereof. A low thermal conductivity, dielectric diaphragm spanning the mesas is supported along its length by the support structure. The diaphragm forms an electrical and thermal insulation barrier over the support structure and the mesas. The flow sensor of the present invention further comprises at least one flow sensing element superposed on the diaphragm so that the flow sensing element is substantially electrically and thermally isolated from the support structure. Accordingly, the flow sensor does not incorporate a "bridge-type" support diaphragm as used in the past. However, the present flow sensor has higher mechanical strength over previous flow sensors without producing a significant increase in conductive heat loss attributed to the materials supporting the sensing/heating elements.

In accordance with another aspect of the present invention, a method for making a flow sensor is provided. The method for forming the flow sensor comprises the steps of forming a masking layer on a <100> silicon substrate, selectively removing portions of the first masking layer and depositing a layer of polysilicon on the substrate and on the remaining segments of the first masking layer. The present method further comprises the steps of depositing a second masking layer on the polysilicon layer and forming openings in the second masking layer with the openings being interposed between each remaining segment of the first masking layer. An etchant is then introduced into the openings in the second masking layer in sufficient quantity and strength such that mesas are formed on the silicon substrate directly beneath the remaining segments of the first masking layer. Finally, the present method comprises the steps of depositing a film of a dielectric, low conductivity substance conformally onto the exposed surfaces of the first masking layer, the second masking layer and the silicon substrate to form a continuous diaphragm, and depositing at least one flow sensing element superposed on the diaphragm.

Accordingly, it is an object of the present invention to provide an improved mass air flow sensor which has higher mechanical strength and is not susceptible to breakage as a result of impact from particles travelling in the air flow stream. It is also an object of the present invention to provide such a flow sensor which does not significantly increase the conductive heat loss from the sensing/heating elements. It is yet another object of the present invention to provide a method for making a flow sensor having the aforementioned features. These and other objects, features and attendant advantages of the present invention will become apparent to those skilled in the art from a reading of the following detailed description of the preferred embodiment, the accompanying drawings, and the appended claims.

DETAILED DESCRIPTION OF THE PREFERRED EMBODIMENT

The present invention meets the aforementioned needs by providing an improved thermal anemometer-type mass air flow sensor which is less susceptible to breakage yet does not significantly increase the conductive heat loss from the sensing/heating elements. The present flow sensor may be mass produced inexpensively in accordance with the method of the present invention which is directed to a silicon-compatible batch process described more fully hereinafter.

Thermal anemometry has been for many years a useful tool for the measurement of fluid flow. Thermal anemometer-type mass air flow sensors, by definition, depend upon heat transfer for their operation. A resistor with a temperature sensitive resistance is typically placed in the flow stream. Electrical current flowing through the hot wire resistor causes the resistor to increase in temperature due to the electrical power input. If the power input is equal to the power removed by the fluid convection, the temperature of the wire remains the same. If there is an increase in the forced convection due to an increase in the fluid velocity or density, the temperature and the resistance of the hot wire will decrease. An electrical circuit compensates for this reduction in resistance by increasing the current so that more electrical power is going into the hot wire returning the resistor to the original temperature. Thus, the balance between the electrical power going into the circuit and the power removed by convection of the fluid is regained. The present air flow sensor more closely provides all of the features desired including an accurate and fast response time without substantially increasing the costs of the materials and processing associated with the present air flow sensor.

Figure 1:
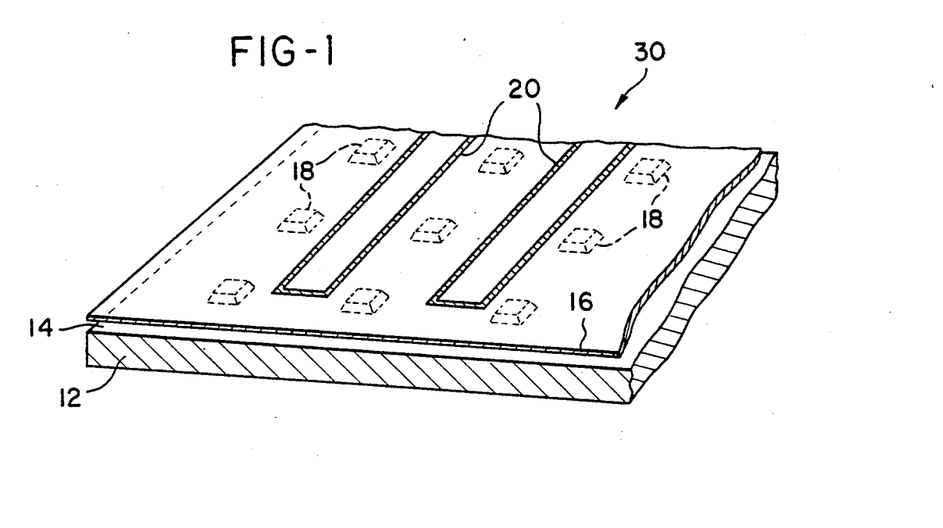
FIG. 1 is a broken perspective view of the central portion of a flow sensor in accordance with the present invention.

Referring now to FIG. 1, a flow sensor 30 is illustrated in accordance with the present invention. A support structure 12 forms the base of flow sensor 30 and has superposed thereon mesas 18 in generally a linearly spaced configuration. A diaphragm 16 is superposed on mesas 18 to form an electrical and thermal insulation barrier over support structure 12 and mesas 18. Such an electrical and thermal insulation barrier is necessary to minimize the conductive heat loss from sensing/heating elements 20. The sensing/heating elements 20 are disposed onto diaphragm 16 and are therefore substantially electrically and thermally insulated from support structure 12. It should be appreciated that FIG. 1 shows a partial broken view of flow sensor 30 taken from the center of a completed flow sensor. Thus, sensing/heating elements 20 may be connected to a pair of conductive terminals (not shown in FIG. 1) and ultimately to a suitable integrated circuit for controlling heating/sensing elements 20.

Support structure 12 preferably comprises materials selected from the group consisting of <100> silicon, glass, quartz, silicon nitride, silicon dioxide and combinations thereof Most preferably, support structure 12 is a <100> silicon wafer having a layer of a material grown or deposited thereon selected from the group consisting of glass, silicon nitride, silicon dioxide and combinations thereof. The particular silicon wafer selected may any one of those commercially available in the industry. Preferably, the silicon wafer has a thickness in a range from about 400 to 740 microns. The most preferred material deposited or grown on support structure 12 is silicon dioxide.

Mesas 18 are formed on support structure 12 in a generally linearly spaced array as shown in FIG. 1. However, it should be understood that mesas 18 may be formed on support structure 12 in any appropriate pattern or array which results in a flow sensor having higher mechanical strength and minimized conductive heat loss. The number and spacing of mesas 18 will depend upon the particular application of flow sensor 30. Thus, if flow sensor 30 is to be exposed to a flow stream having large amounts of particles and/or other debris, mesas 18 will be greater in number and spaced closer together. Such an arrangement provides higher mechanical strength to withstand the large amounts of particles and/or debris. Conversely, if flow sensor 30 is to be exposed to a flow stream having minimal amounts of particles and debris, mesas 18 will be fewer in number and spaced farther apart to minimize the conductive heat loss from sensing/heating elements 20. Thus, the flow sensor of the present invention may be produced to provide and optimum balance between high mechanical strength and minimized conductive heat loss from sensing/heating elements 20 depending on the environment to which it will be exposed. Mesas 18 preferably comprise materials selected from the group consisting of silicon, silicon nitride, silicon dioxide and combinations thereof. Most preferably, mesas 18 will comprise a combination of silicon and silicon dioxide. The relative height of mesas 18 is preferably in a range from about 5.0 to 100 microns. The shape of mesas 18 may be pyramidal, circular or rectangular and may have a center-to-center spacing from about 5.0 microns to about 100 microns. Generally, the width of an individual mesas may be from 5.0 microns to 100 microns.

Figure 2:
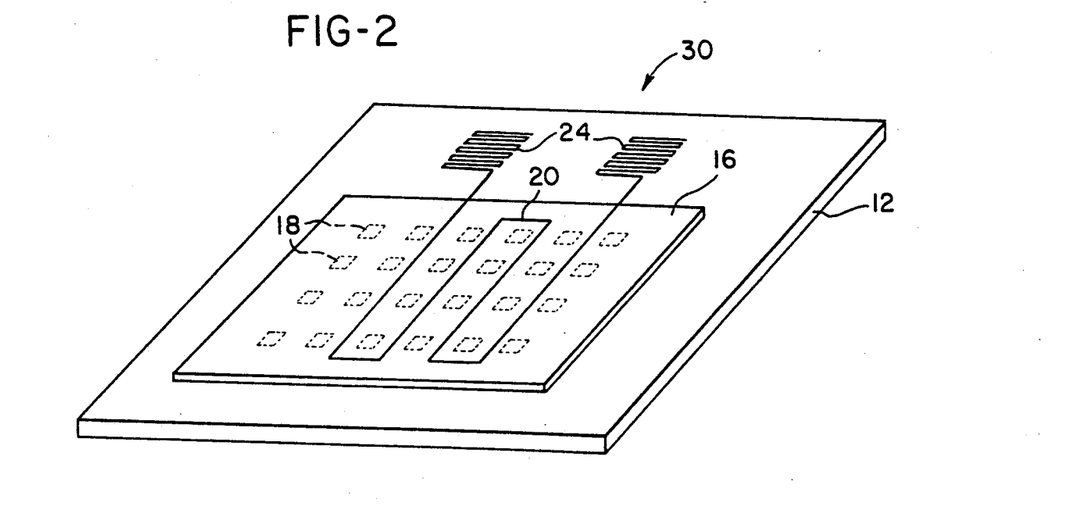
FIG. 2 is a perspective view of a flow sensor in accordance with, the present invention.

Diaphragm 16 is preferably formed from materials selected from the group consisting of silicon dioxide, silicon nitride and combinations thereof. The aforementioned materials are selected so as to permit diaphragm 16 to substantially electrically and thermally isolate sensing/heating elements 20 from support structure 12. Disposed between support structure 12, mesas 18 and diaphragm 16 is a dielectric air gap 14 which further electrically and thermally isolates sensing/heating elements 20 from support structure 12. Thus, the conductive heat loss from sensing/heating elements 20 is minimized. As shown in FIGS. 1 and 2, the diaphragm 16 possesses a length and a width. FIGS. 1 and 2 also show the diaphragm 16 having first and second ends wherein the mesas 18 are positioned at the first and second ends and at least one of the mesas 18 is positioned intermediate the first and second ends to support the diaphragm 16 so as to prevent breakage along its length. Mesas 18 provide structural support for diaphragm 16 to increase its mechanical strength. Yet mesas 18 provide the requisite structural support for diaphragm 16 without substantially increasing the conductive heat loss from sensing/heating elements 20 through diaphragm 16 and mesas 18 to support structure 12. Therefore, flow sensor 30 is both more efficient and less susceptible to breakage, particularly if exposed to hostile environments. The relative thickness of diaphragm 16 is preferably in a range from about 0.3 microns to 5.0 microns. The relative thickness and volume of air gap 14 will depend on the dimensions of mesas 18 since air gap 14 fills the void that mesas 18 leaves between diaphragm 16 and support structure 12.

Flow sensor 30 further comprises sensing/heating elements 20 which are superposed on diaphragm 16 and may be adapted to be used as a hot wire anemometer. It should be appreciated that sensing/heating elements 20 may be superposed on diaphragm 16 in any desired pattern or configuration. The sensing/heating elements 20 may be superposed onto diaphragm 16 using a suitable photoresist, photo mask and etchant solution. The details of the photoresist cycle are discussed fully hereinafter with regard to the present method for making flow sensor 30. Heating/sensing elements 20 are preferably formed from a metal coating selected from the group consisting of tantalum, platinum, palladium, nickel and nickel alloys.

The integrated circuit may be superposed on the periphery of diaphragm 16 to control sensing/heating elements 20 or alternatively, a pair of conductive terminals 24 (shown in FIG. 2) may be superposed on the periphery of flow sensor 30 so as to provide an electrical contact for an integrated circuit positioned separate from flow sensor 30. Conductive terminals 24 may comprise a metal applied by any known method including but not limited to sputtering and chemical vapor deposition. The metal used to form conductive terminals 24 may be selected from the group consisting of platinum, gold and nickel. It will be appreciated by those skilled in the art that other metals and methods of formation may be used to form conductive terminals 24 on flow sensor 30. The integrated circuit may include any electronic circuitry known in the art and may be formed with a multitude of components available in the integrated circuit (IC) industry. The chosen integrated circuit is capable of controlling sensing/heating elements 20. In that regard, many different circuits may be suitable for flow sensor 30. The chosen integrated circuit may be superposed on flow sensor 30 by way of known techniques in the art including but not limited to sputtering and Low Pressure Chemical Vapor Deposition (LPCVD). Alternatively, the integrated circuit may be on a printed circuit (PC) board as is well known in the industry.

Referring now to FIG. 2, a completed flow sensor 30 is shown. The completed version of flow sensor 30 includes diaphragm 16 and a plurality of mesas 18 centrally located within flow sensor 30, support structure 12 forming the base thereof, and sensing/heating elements 20 superposed on diaphragm 16. Flow sensor 30 may include a pair of conductive terminals 24 positioned on the periphery of support structure 12. The conductive terminals 24 electrically contact sensing/heating element 20 and provide a means for electrically connecting flow sensor 30 to an integrated circuit (not shown in FIG. 2) positioned separate from flow sensor 30 for controlling heating/sensing elements 20. Alternatively, the integrated circuit itself may be positioned directly on the periphery of support structure 12 and connected to a current source.

Figure 3A:
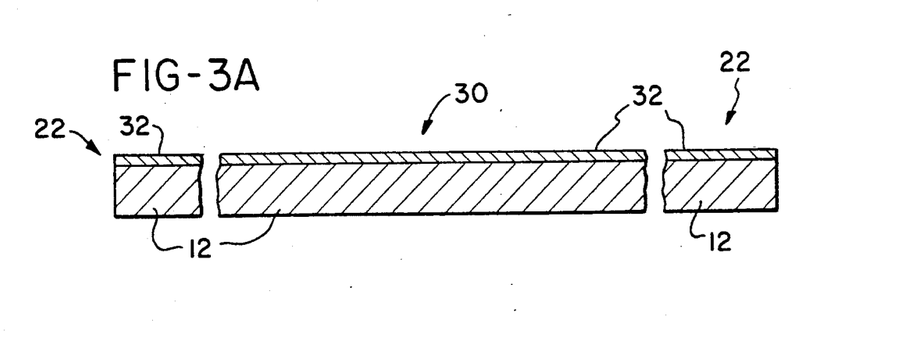
FIGS. 3A-3H present broken cross-sectional views of a flow sensor shown in FIG. 2 taken along line 3—3 as it is produced in accordance with the present invention.

Referring now to FIGS. 3A–3H, a sequential illustration of a preferred method for producing flow sensor 30 is shown in broken cross-sections The method comprises the initial step of forming a masking layer 32 on support structure 12. Support structure 12 comprises materials selected from the group consisting of <100> silicon, glass, quartz, silicon nitride, silicon dioxide and combinations thereof. As can be seen in FIG. 3A, masking layer 32 is grown or deposited over the entire surface of support structure 12 including the periphery 22 of flow sensor 30. Preferably, masking layer 32 is formed from a material selected from the group consisting of silicon dioxide, silicon nitride and combinations thereof. Masking layer 32 may be grown or deposited by LPCVD (Low Pressure Chemical Vapor Deposition) onto support structure 12 or formed thereon by other techniques known in the art. Masking layer 32 preferably has a thickness in the range of from about 0.1 to 2.0 microns.

Thereafter, masking layer 32 is patterned in the desired configuration to form mesas 18 of flow sensor 30 by subjecting the flow sensor 30 to a photoresist cycle which is commonly known to those skilled in the art. More specifically, the flow sensor 30 as shown in FIG. 3A is placed in an oven which is thereafter evacuated to a low pressure. The oven is then heated to approximately 100° C. and maintained at a low pressure such as $5 \times 10^{-3}$ Torr. An adhesion promoter is sprayed onto flow sensor 30 and allowed to reach equilibrium with the environment inside the oven. Any adhesion promoter commercially available in the industry may be used in accordance with the present invention. For example, the adhesion promoter, hexamethyldisilizane, is suitable for the present invention. Thereafter, the flow sensor 30 is removed from the oven and placed on a turntable to prepare flow sensor 30 for receiving a positive photoresist. Any known positive photoresist commercially available in the industry may be used. For example, a positive photoresist from Shipley Co. (product #1470) is suitable for the present method. The turntable having flow sensor 30 placed thereon is rotated at about 2000 to 5000 rpm such that a uniform coating of positive photoresist is formed over flow sensor 30. The preferable thickness of the positive photoresist is in a range from about 0.5 microns to about 8.0 microns. The period of time for such turntable rotation will depend upon the viscosity of the positive photoresist and the spin speed. It should appreciated that those skilled in the art may deviate from these parameters in forming the uniform coat of positive photoresist over flow sensor 30. Flow sensor 30 is then removed from the turntable and subjected to a soft-bake in an oven for approximately 20 minutes at about 90° C. to remove any excess solvents remaining on flow sensor 30.

A suitable photo mask which includes the desired pattern is placed between flow sensor 30 and a UV light source. The photo mask used in the present invention will include a pattern typically formed of chrome metal that is directed to the desired configuration for mesas 18. Accordingly, the photo mask is placed between flow sensor 30 and the UV light source and irradiated with UV light to cross-link the positive layers which photoresist. The photo mask which is patterned with chrome precludes the positive photoresist on masking layer 32 from being exposed to the UV light and thus crosslinked or developed. The flow sensor 30 is washed with a suitable base, for example, from the Shipley Co. (product # NF 312). The result is a photoresist mask formed around the desired pattern for mesas 18. Flow sensor 30 is subjected to a hard-bake in an oven for approximately 20 minutes at about 120° C. This step reinforces the photoresist mask by evaporating the excess photoresist and base. Thereafter, an appropriate etchant is introduced onto flow sensor 30 for etching masking layer 32. If masking layer 32 is formed of an oxide material, the appropriate etchant will be a wet etchant such as buffered hydrofluoric acid (BHF). However, if masking layer 32 is formed of a nitride material, the appropriate etchant derives from a sulfur hexafluoride plasma formed in a vacuum chamber. In particular, flow sensor 30 is placed between a pair of electrodes enclosed in a vacuum chamber which includes a valve through which the sulfur hexafluoride material is introduced into the vacuum chamber. A voltage difference is applied across the electrodes thereby ionizing the sulfur hexafluoride plasma. The result is the formation of a plasma of fluoride ions and hydrogen ions positioned between flow sensor 30 and the electrodes. The fluoride ions serve as the etchant to etch the nitride film as desired. The time of exposure will depend upon the amount of etching required for flow sensor 30. For example, a typical etching cycle will occur at a rate of 0.1 microns/minute.

Figure 3B:
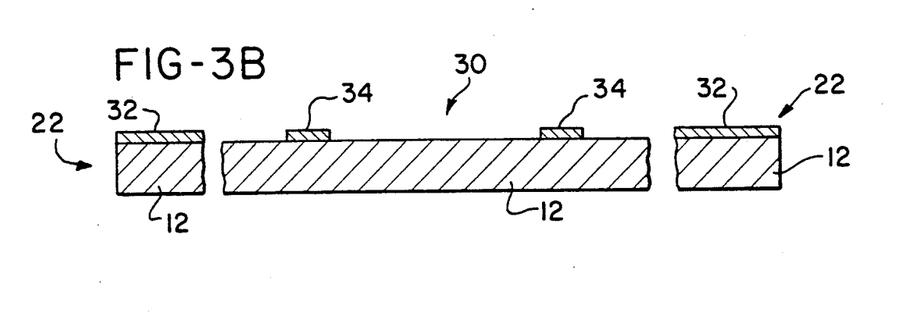

After flow sensor 30 has been etched as described above, it is subjected to a 1:1 mixture of hydrogen peroxide/ sulfuric acid ($H_2O_2/H_2SO_4$) for approximately 15 minutes at about 110° C. The flow sensor 30 is rinsed with deionized water and dried in a spin dryer. The foregoing steps described are hereinafter referred to as a photoresist cycle. After the aforedescribed photoresist cycle, flow sensor 30, as shown in FIG. 3B, includes a pattern layer 34 positioned generally at a central location of flow sensor 30 defining the bases of mesas 18 which are ultimately formed on support structure 12. The aforementioned photoresist mask pattern does not include periphery 22 of flow sensor 30 and therefore, pattern layer 34 is shown to be superposed thereuaround.

The present method next forms a relatively thick layer of a readily etchable material over the entire upper surface of flow sensor 30. The preferable readily etchable material is polysilicon. Other materials that may be considered etchable include oxides and nitrides and may be substituted therefor. Thereafter, flow sensor 30 is subjected to another photoresist cycle as described above. The photo mask employed is patterned such that the etchable material will remain on the central portion of flow sensor 30. Accordingly, periphery 22 of flow sensor 30 is etched with a suitable etchant as described above. After the photoresist cycle, etched flow sensor 30 includes an etchable layer 36 as shown in FIG. 3C.

Figure 3C:
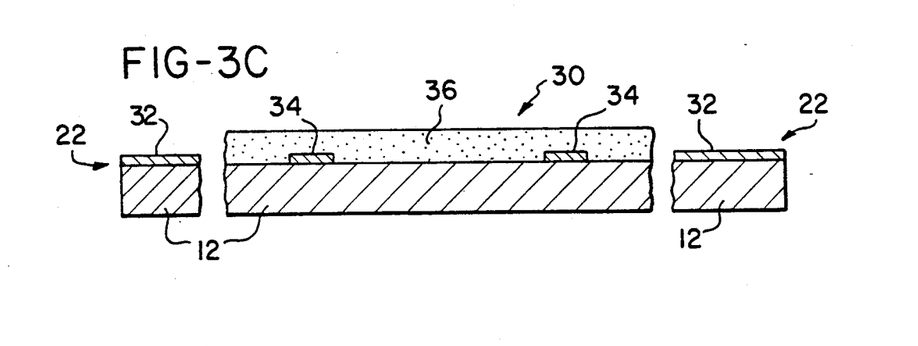

As can be seen in FIG. 3C, flow sensor 30 includes periphery 22 comprising support structure 12 and masking layer 32 deposited thereon. In the center of flow sensor 30, support structure 12 includes patterned layer 34 with an etchable layer 36 deposited onto patterned layer 34 and support structure 12. FIG. 3C shows a relatively thick etchable layer 36 deposited over the entire support structure 12 with the exception of periphery 22. The preferable thickness for etchable layer 36 is in a range from about 0.5 microns to 2.0 microns The etchable layer 36 acts as a fast etch layer which will rapidly propagate the aforedescribed etching step laterally. Additionally, etchable layer 36 serves as a spacer to set precisely and easily the spacing between support structure 12 and a diaphragm 16 which is formed ultimately. The spacing is filled by the previously described air gap 14 which acts as a dielectric barrier between sensing/heating elements 20 and support structure 12.

Figure 3D:
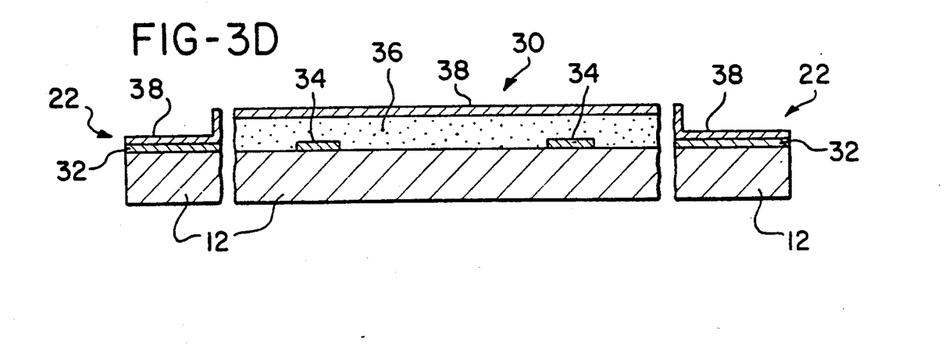

A second masking layer 38 is formed on etchable layer 36 to serve as an etch mask and to form a dielectric diaphragm layer referred to as diaphragm 16. Referring now to FIG. 3D, second masking layer 38 is shown to be deposited around periphery 22 and built up onto the center of flow sensor 30. Preferably, second masking layer 38 is formed of a material selected from the group consisting of silicon dioxide, silicon nitride and combinations thereof. Second masking layer 38 may be grown or deposited by LPCVD (Low Pressure Chemical Vapor Deposition) on support structure 12. It should be appreciated by those skilled in the art that other known techniques may be used to form second masking layer 38. Second masking layer 38 preferably has a thickness in a range from about 0.1 to 2.0 microns.

Figure 3E:
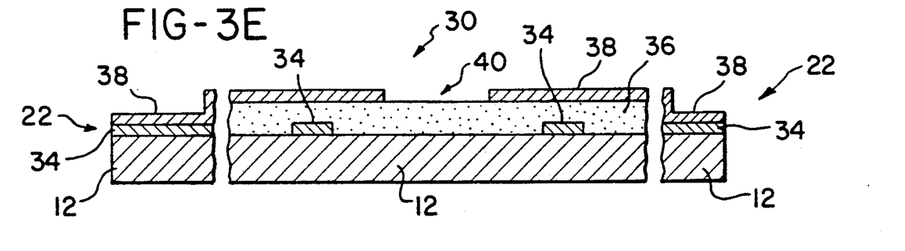

As shown in FIG. 3E, an opening 40 is patterned into second masking layer 38 by subjecting flow sensor 30 to another photoresist cycle as described above. The photo mask employed will be patterned for opening 40 and etched accordingly. A wet etchant (acid) will be used if second masking layer 38 is an oxide. However, if second masking layer 38 is a nitride, a sulfur hexafluoride plasma formed within a vacuum chamber as described above will be used as the etchant. Opening 40 is required so as to allow etching of etchable layer 36 and support structure 12. It should be appreciated that several openings such as opening 40 may be patterned onto second masking layer 38 for this purpose. The relative size of each opening 40 is preferably at least twice the height of the etchable layer 36. Preferably, the openings are interposed between mesas 18. Accordingly, the preferable width and length of opening 40 is in a range from about 1.0 microns to 4.0 microns.

Figure 3F:
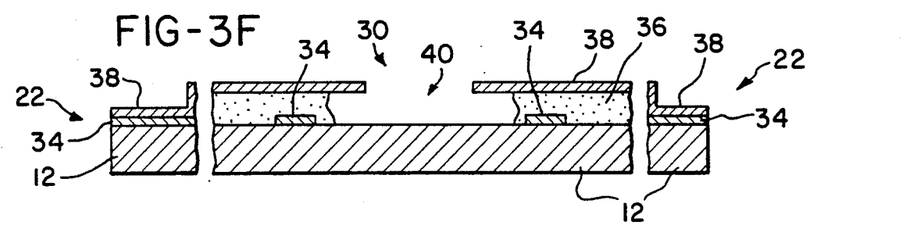

FIG. 3F illustrates flow sensor 30 during the etching process whereby the additional etchant is injected through opening 40 to etch away etchable layer 36 which is disposed between support structure 12 and second masking layer 38. The etchant is preferably any anisotropic etchant commercially available in the industry. For example, ethylenediamine-pyrocatechol, potassium hydroxide, sodium hydroxide and hydrazine may be used as the anisotropic etchant in accordance with the present method. The anisotropic etchant dissolves all of etchable layer 36 that is disposed between second masking layer 38 and support structure 12. Additionally, a desired amount of support structure 12 is etched, yet pattern layer 34 remains intact so as to further form mesas 18. The anisotropic etchant does not etch pattern layer 35 and second masking layer 38 at periphery 22 since they are formed of nitrides and/or oxides which are not affected by the aforementioned anisotropic etchant. As a result, periphery 22 of flow sensor 30 is not affected by the etchant solution as shown in FIG. 3F.

Figure 3G:
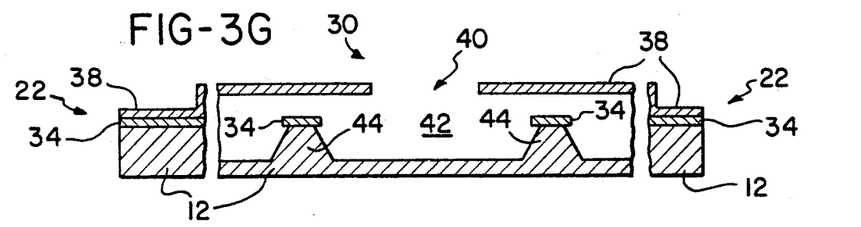

FIG. 3G illustrates flow sensor 30 after the second etching step has been completed. Etchable layer 36 and a portion of support structure 12 are shown to be etched away, excluding pyramidal etched pillar 44 of support structure 12 which ultimately form mesas 18. The air gap 14 is formed between pattern layer 34 and second masking layer 38. As stated previously, air gap 14 serves as a dielectric layer thus forming a thermal and electrical insulation barrier between support structure 12 and second masking layer 38.

Figure 3H:
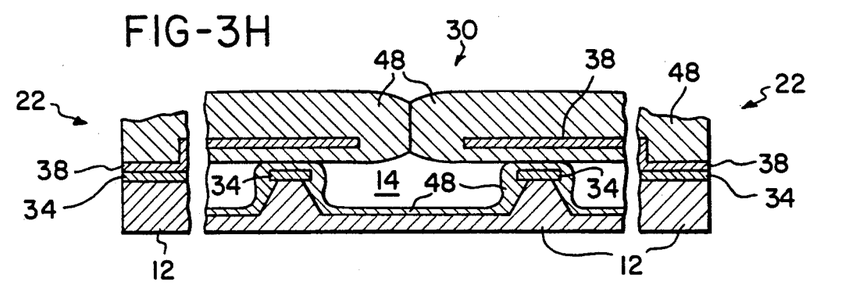

FIG. 3H illustrates the next step of the process wherein materials selected from the group consisting of silicon dioxide, silicon nitride and combinations thereof is deposited through openings 40 and onto support structure 12 by a known deposition technique such as LPCVD. As is known in the art, this forms a conformal coating. Conformal coating 48 fills air gap 14 to the extent that it connects masking layer 34 with second masking layer 38 to form mesas 18 (shown in FIG. 3I) comprising the etched pillar 44, masking layer 34 and conformal layer 48. Conformal layer 48 also closes opening 40 and spreads over periphery 22 of flow sensor 30 as shown in FIG. 3H.

Figure 3I:
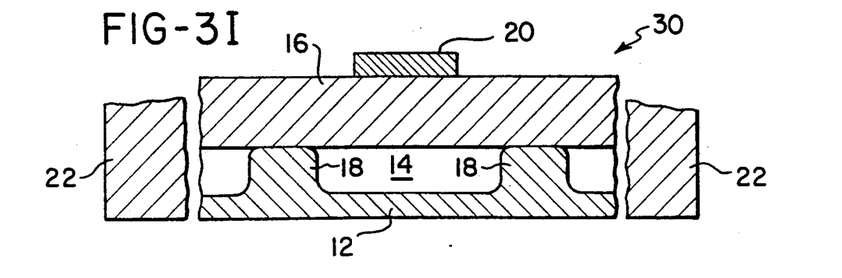
FIG. 3I is a broken side view of the flow sensor as shown in FIG. 2.

A side view of the completed flow sensor 30 is illustrated in FIG. 3I and includes sensing/heating elements 20 superposed onto diaphragm 16. It should be understood that the center portions of conformal coating 48 and second masking layer 38 together comprise diaphragm 16. Sensing/heating elements 20 are formed by depositing a blanket layer of a metal over the entire upper surface of flow sensor 30. The metal is may be any of those known in the art including chrome, nickel and platinum. The thickness of the metal layer is preferably in a range from about 0.04 microns to about 2.0 microns. Thereafter, an aforedescribed photoresist cycle is followed to etch the metal layer into the desired pattern. It should be appreciated by those skilled in the art that sensing/heating elements 20 may be formed directly on flow sensor 30 as well as by adhesively securing prefabricated sensing/heating elements to the upper surface of flow sensor 30. Diaphragm 16 comprises second masking layer 38 and conformal layer 48 as described previously with regard to FIG. 3H. Mesas 18 are shown in their final form and are positioned on the surface of support structure 12. Mesas 18 comprise etched pillar 44, patterned layer 34, and conformal coating 48. The periphery 22 of flow sensor 30 comprises support structure 12, masking layer 34, and peripheral portions of second masking layer 38 and conformal layer 48 as described with regard to FIG. 3H.

Having thus described the flow sensor and method for making the same of the present invention in detail and by reference to the preferred embodiments thereof, it would be apparent that certain modification and variations are possible without departing from the scope of the invention defined in the appended claims.

What is claimed is:
1. A flow sensor comprising:
   (a) a support structure including a base having a plurality of spaced mesas on a surface thereof;
   (b) a low thermal conductivity, dielectric diaphragm spanning said mesas; said diaphragm having first and second ends wherein said mesas are positioned at said first and second ends and at least one of said mesas is positioned intermediate said first and second ends to support said diaphragm so as to prevent breakage along its length; said diaphragm forming an electrical and thermal insulation barrier over said support structure and said mesas; and
   (c) at least one flow sensing element superposed on said diaphragm so that said at least one flow sensing element is substantially electrically and thermally isolated from said support structure.

2. The flow sensor of claim 1 wherein said support structure comprises materials selected from the group consisting of <100> silicon, glass, quartz, silicon nitride, silicon dioxide and combinations thereof.

3. The flow sensor of claim 1 wherein said support structure is <100> silicon having a layer of a material deposited thereon selected from the group consisting of glass, silicon nitride, silicon dioxide and combinations thereof.

4. The flow sensor of claim 1 wherein said mesas comprise materials selected from the group consisting of silicon, silicon nitride, silicon dioxide and combinations thereof.

5. The flow sensor of claim 1 wherein said diaphragm is formed from materials selected from the group consisting of silicon dioxide, silicon nitride and combinations thereof.

6. The flow sensor of claim 1 wherein said at least one flow sensing element comprises a metal coating superposed on said diaphragm adapted to be used as a hot wire anemometer.

7. The flow sensor of claim 1 wherein a said at least one flow sensing element comprises a metal coating superposed on said diaphragm adapted to be used as an air temperature sensor.

8. The flow sensor of claim 1 wherein said at least one flow sensor includes a pair of conductive terminals superposed on the periphery of said support structure, said terminals electrically contacting said at least one flow sensing element.

9. The flow sensor of claim 1 wherein an integrated circuit is formed on the periphery of said support structure to control said at least one flow sensor.

10. The flow sensor of claim 1 wherein said diaphragm has a thickness in a range from about 0.3 microns to 5.0 microns.

11. The flow sensor of claim 1 wherein said support structure has a thickness in a range from about 400 to 740 microns.

12. The flow sensor of claim 1 wherein said means have a height of about 5.0 microns to about 100 microns.

13. A flow sensor comprising:
(a) a <100> silicon wafer including a base having a plurality of spaced mesas having a height of about 5.0 microns to about 100 microns on one surface thereof;
(b) a low thermal conductivity, dielectric diaphragm made from materials selected from the group consisting of silicon nitride, silicon oxide and combinations thereof; said diaphragm spanning said mesas; said diaphragm having first and second ends wherein said mesas are positioned at said first and second ends and at least one of said mesas is positioned intermediate said first and second ends to support said diaphragm so as to prevent breakage along its length; said diaphragm forming an electrical and thermal insulation barrier over said support structure and said mesas;
(c) a first metal coating superposed on said diaphragm adapted to be used as an air temperature sensor; and
(d) a second metal coating superposed on said diaphragm adapted to be used as a hot wire anemometer.

14. The flow sensor of claim 13 wherein a pair of conductive terminals are superposed on the periphery of said support structure, said terminals are electrically contacting said metal coating.

15. The flow sensor of claim 13 wherein an integrated circuit is superposed on the periphery of said structure to control said air temperature sensor and said hot wire anemometer.

16. The flow sensor of claim 13 wherein said first and second metal coatings are selected from the group consisting of tantalum, platinum, palladium, nickel and nickel alloys.

17. A flow sensor comprising:
(a) a support structure including a base having a plurality of spaced mesas on a surface thereof;
(b) a low thermal conductivity, dielectric diaphragm spanning said mesas; said diaphragm having a length and a width wherein said mesas are spaced at a plurality of locations of not less than three along each of said length and said width to support said diaphragm so as to prevent breakage thereof; said diaphragm forming an electrical and thermal insulation barrier over said support structure and said mesas; and
(c) at least one flow sensing element superposed on said diaphragm so that said at least one flow sensing element is substantially electrically and thermally isolated from said support structure.

* * * * *

UNITED STATES PATENT AND TRADEMARK OFFICE
CERTIFICATE OF CORRECTION

PATENT NO.   :   5,205,170
DATED        :   April 27, 1993
INVENTOR(S)  :   Chester J. Blechinger & Paul E. Stevenson It is certified that error appears in the above-identified patent and that said Letters Patent is hereby corrected as shown below:

Column 11, line 33, "said means have" should be --said mesas have--.

Signed and Sealed this

Fourth Day of January, 1994

Attest:

BRUCE LEHMAN

Attesting Officer

Commissioner of Patents and Trademarks